United States Patent [19]

Sheinkop

[11] 4,405,351
[45] Sep. 20, 1983

[54] METHOD FOR CONTROLLING A GLASS MELTING FURNACE

[75] Inventor: Isac M. Sheinkop, Reynoldsburg, Ohio

[73] Assignee: Owens-Corning Fiberglas Corporation, Toledo, Ohio

[21] Appl. No.: 278,790

[22] Filed: Jun. 29, 1981

[51] Int. Cl.³ .............................................. C03B 5/24
[52] U.S. Cl. ...................................... 65/29; 65/136; 65/337; 65/DIG. 13
[58] Field of Search ............ 65/337, 29, 136, DIG. 13

[56] References Cited

U.S. PATENT DOCUMENTS

| | | | |
|---|---|---|---|
| 3,573,017 | 3/1971 | Griem, Jr. | 65/136 X |
| 3,600,149 | 8/1971 | Chen et al. | 65/29 X |
| 3,811,860 | 5/1974 | Nier | 65/136 X |
| 3,838,999 | 10/1974 | Groves | 65/29 |
| 3,954,433 | 5/1976 | Holler | 65/29 |
| 4,028,083 | 6/1977 | Patznick | 65/DIG. 13 |

Primary Examiner—Arthur D. Kellogg
Attorney, Agent, or Firm—Ronald C. Hudgens; Patrick P. Pacella; Ted C. Gillespie

[57] ABSTRACT

A method for controlling a glass melting furnace comprises measuring the temperature T of the glass in the furnace, measuring the heat being supplied to the glass in the furnace, calculating the entropy E according to the equation $$E = (Q/T)$$

comparing E with a predetermined entropy $E_O$, changing Q to a new value of heat $Q'$ responsive to $(E - E_O)$, and supplying heat $Q'$ to the furnace.

4 Claims, 2 Drawing Figures

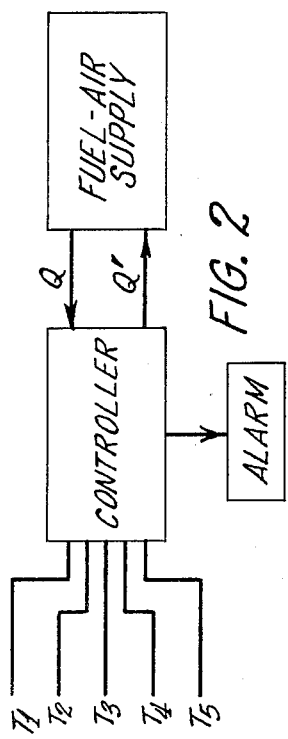
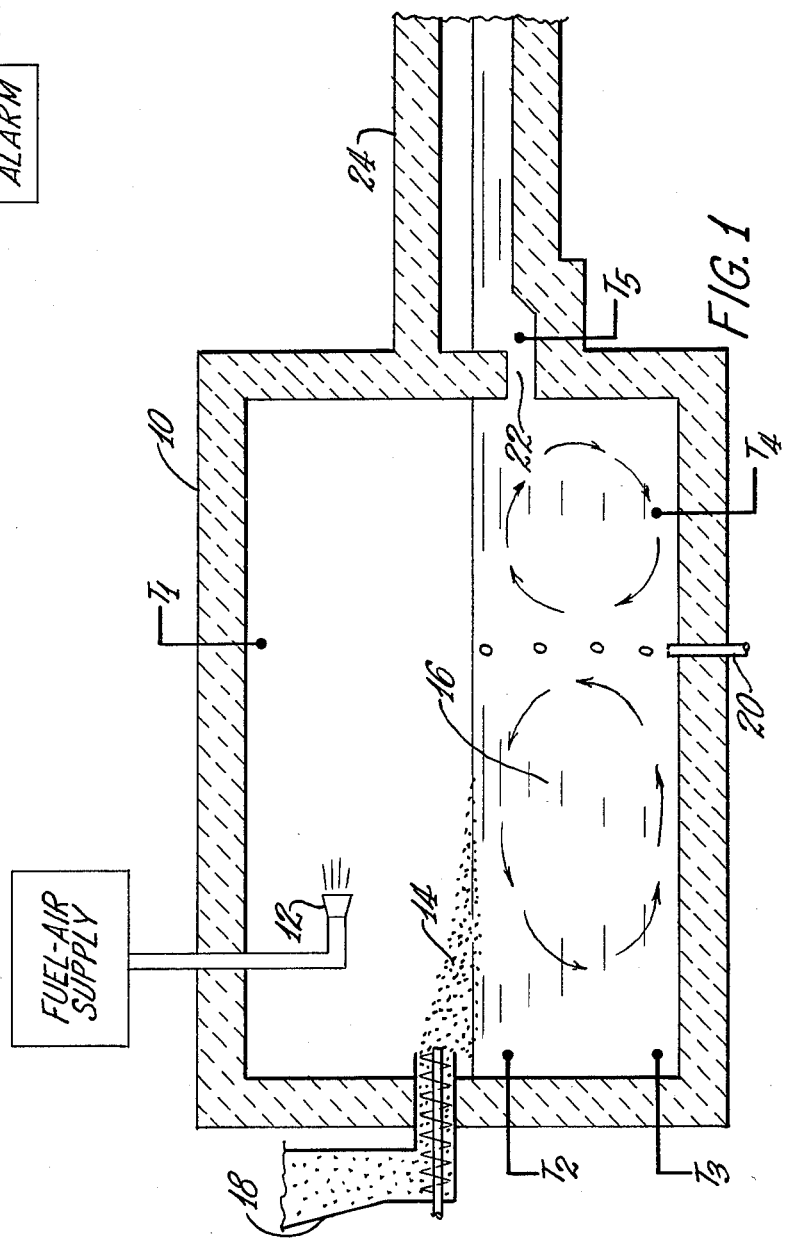

METHOD FOR CONTROLLING A GLASS MELTING FURNACE

TECHNICAL FIELD

This invention relates to controlling a glass melting furnace. In one of its more specific aspects, this invention relates to measuring temperatures at various positions within a glass melting furnace, and controlling the amount of heat supplied to the furnace in response to the measured temperatures.

BACKGROUND OF THE INVENTION

In the manufacture of glass products, particularly glass fiber products, glass is continuously melted in a large furnace capable of raising the temperature of the glass to temperatures on the order of 2600° F. (1426° C.). Glass batch material is usually supplied either to one end of the furnace, or to the top surface of the molten glass, in the case of an electric furnace. Heat is supplied to the molten glass and to the unmelted batch material by burners positioned above the batch material in a fossil fueled furnace, and is supplied by electrodes positioned within the molten glass in an electric furnace.

Subsequent to melting, the molten glass slowly travels through the furnace and passes through the furnace exit or throat to the forehearth. The movement of the glass is usually effected by convection currents, bubblers and glass pull effects. In order to provide glass of uniform consistency, the glass is made to travel slowly through the melter and through the forehearth. The forehearth supplies the molten glass to apparatus suitable for forming the glass products, such as bushings for producing continuous glass fibers. The apparatus for producing the glass products is generally sensitive to temperature changes in the molten glass supplied thereto. Therefore, it is extremely important that the temperature of the molten glass supplied to such apparatus not change over time.

There are several factors which tend to cause disruptions in the uniformity of the glass temperature in the forehearth. Changes in the pull rate, the batch distribution process, or in the batch composition itself, can cause non-uniformities. Changes in the bubbler, or in the level of the molten glass within the furnace, can also cause problems with uniformity of temperature. Also, heat losses from the molten glass to the atmosphere and to the walls of the furnace can vary, thereby producing non-uniformities in the temperature of the glass by the time it reaches the forehearth.

One aspect of the furnace controls of many present furnaces is that there is a considerable time lag between the time changes are made in the amount of heat Q provided to the furnace and the time at which such changes can be perceived at the furnace exit or throat. Almost all glass furnace control systems rely on temperature measurements at various positions within the furnace to control the amount of heat provided to the furnace. Temperature measurements are usually taken within the combustion chamber of the furnace, at the exit or throat of the furnace, and at several other locations within the molten glass.

Current methods of controlling the amount of heat Q provided to the furnace in response to temperature measuremens are not entirely satisfactory. Temperature measurements in some locations are more sensitive to changes in the molten glass temperature, and are better predictors of the final temperature of the molten glass when it reaches the furnace exit or throat. A controller which controls a furnace just based on temperature measurements fails to recognize the effects of different thermal charges, or entropy E, being produced in the melting process.

SUMMARY OF THE INVENTION

The present invention solves the above problems by providing for changes in the heat Q supplied to the furnace as a function of change in the thermal charge or entropy E of the glass mass. The entropy of the glass mass is a very important factor in determining the uniformity of the glass temperature of the molten glass. Also, controlling the furnace with the entropy is a more thermally efficient method than methods relying on temperature measurements alone.

According to this invention, there is provided a method for controlling the melting of heat softenable mineral material in a furnace comprising measuring the temperature T of the mineral material in the furnace, measuring the heat Q being supplied to the mineral material in the furnace, calculating the entropy E according to the following equation:

$$E = (Q/T)$$

comparing E with a predetermined entropy $E_O$, changing heat Q to a new value of heat $Q'$ responsive to the difference between E and $E_O$, and supplying heat $Q'$ to the furnace.

In one embodiment of the invention, the temperature T is calculated according to the following equation:

$$T = K_1 T_1 + K_2 T_2 + K_3 T_3 + \ldots + K_n T_n$$

where $T_1, T_2, T_3, \ldots T_n$ are temperatures measured at n different positions in the furnace, and where $K_1, K_2, K_3, \ldots K_n$ are constants reflecting the relative effect of each of the temperatures $T_1, T_2, T_3, \ldots T_n$ on the entropy E.

In a preferred embodiment of the invention, for each temperature $T_i$ of the temperatures $T_1, T_2, T_3, \ldots T_n$ there is a predetermined range $\Delta T_i$ of temperatures, and further including generating a signal whenever any temperature $T_i$ is outside its range $\Delta T_i$.

In a specific embodiment of the invention, Q is changed to $Q'$ only if $[E - E_O]$ exceeds a predetermined value $E_L$.

In another specific embodiment of the invention, a signal is generated whenever $[E - E_O]$ exceeds a predetermined value $E_A$.

In another specific embodiment of the invention, the entropy E is maintained substantially equal to the set-point entropy $E_O$.

DESCRIPTION OF THE DRAWINGS

FIG. 1 is a schematic cross section in elevation of a glass melting furnace according to the principles of this invention.

FIG. 2 is schematic diagram of the control scheme for the furnace of FIG. 1.

DESCRIPTION OF THE INVENTION

This invention will be described in terms of a glass fiber melting operation fired by fossil fuel, although it is to be understood that the invention can be practiced using other heat softenable mineral material, such as rock, slag and basalt, and it is to be understood that the furnace can be fired electrically.

As shown in FIG. 1, furnace 10 is provided with heat Q from burner 12, which is supplied with a fuel-air mixture, such as a mixture of air and natural gas, from the fuel air supply, shown schematically. Glass batch material 14 suitable for making molten glass 16 is supplied to the furnace by any suitable means such as batch 18. Bubbler 20 can be employed to induce currents within the molten glass in the furnace. After being melted, the molten glass spends considerable time flowing through the furnace, and eventually flows through furnace throat 22 and into refiner or channel 24. Downstream from the channel can be positioned one or more forehearths and suitable glass product forming apparatus, not shown. Numerous means for measuring the temperature in the furnace, such as thermocouples $T_1$, $T_2$, $T_3$, $T_4$ and $T_5$ are positioned in strategic locations.

As shon in FIG. 2, the thermocouples are connected to the controller which receives the temperatures from the various positions. The fuel-air supply is also operatively connected to the controller so that the controller can operate with the knowledge of the heat Q being supplied to the furnace at any given time. Also, the controller can provide a signal to the fuel-air supply changing the heat supplied to a new value of heat —Q'. The controller can be any means, such as a digital computer, for receiving data from the fuel-air supply means and the thermocouples, for calculating the required values of entropy, temperature and heat input Q', and for communicating the results via signals to the fuel-air supply means and to alarms.

In operation, the controller can be set up to calculate the thermal charge or entropy according to the equation $$E = (Q/T) \quad (1)$$

where T is the temperature at a selected position in the furnace. The value of the entropy E is then compared with a predetermined entropy $E_O$, and a new value of heat Q' to be supplied to the furnace is determined in response to the differences in the entropies, $E - E_O$. A representative value for the setpoint entropy would be 35 k-cal. per K°. A signal with respect to the new heat Q' is given to the fuel-air supply, and heat is supplied to the furnace at the new rate Q'.

Preferably, the temperature T in the equation (1) above is calculated with the following equation:

$$T = K_1T_1 + K_2T_2 + K_3T_3 + \ldots + K_nT_n \quad (2)$$

where $T_1$, $T_2$, $T_3$, ... $T_n$ are temperatures measured at n different positions in the furnace, and where $K_1$, $K_2$, $K_3$, ... $K_n$ are constants reflecting the relative effect of each of the temperatures $T_1$, $T_2$, $T_3$, ... $T_n$ on the temperature T to be used in the calculation of the entropy. Each coefficient $K_i$ can be determined experimentally. It is to be understood that the constants $K_1$, $K_2$, $K_3$, . . . $K_n$ may continually have to be recalculated by the controller to reflect changes in such variables as pull, temperature, and glass level. Also, there can be provided for each temperature $T_i$ a predetermined range $\Delta T_i$ of temperatures which are temperatures acceptable for the location at which the temperature $T_i$ is measured. The controller can be adapted to generate a signal whenever any temperature $T_i$ is outside its range $\Delta T_i$.

The controller can be adapted to compare the calculated entropy E with the predetermined setpoint entropy $E_O$ and to change Q to a new value of heat input Q' only if $[E - E_O]$ exceeds a predetermined value $E_L$, i.e., only if $[E - E_O] > E_L$. $E_L$ can be within the range of from about 1 percent to about 5 percent of $E_O$. This procedure will have a damping effect on fluctuations in the heat Q supplied to the furnace. The controller can also be adapted to generate a signal, such as an alarm, whenever $[E - E_O]$ exceeds a predetermined value $E_A$, i.e., whenever $[E - E_O] > E_A$. In such an event, the operators would have notice that the entropy had changed by an amount greater than the predetermined value $E_A$. $E_A$ can be within the range of from about 2 percent to about 10 percent of $E_O$.

As an example, assume T decreases because of a glass pull increase, or for some other reason. Then the entropy equation will result in a greater entropy than the setpoint entropy $E_O$, i.e., $E - E_O > 0$. Assuming $E - E_c > E_L$, the controller imputes a new value of heat Q' which is greater than the previous value of heat Q. Eventually, the temperature of the furnace is raised to the extent that $E = E_O$, at which time Q is again adjusted to maintain the equilibrium.

In practice, it is preferable to maintain $[E - E_O]$ as small as possible, i.e., to operate with the smallest possible change in entropy or thermal change and always return to the setpoint entropy $E_O$, since changes in entropy result in an irreversible loss of energy. Over the life of the furnace, the value of the setpoint entropy $E_O$ will gradually change, primarily with changes in the furnace due to corrosion of the furnace refractories.

INDUSTRIAL APPLICABILITY

This invention will be found to be useful in the melting of glass to provide molten glass for such uses as the production of glass fibers.

I claim:
1. A method for controlling the melting of heat-softenable mineral material in a furnace comprising:
   a. measuring the temperature T of the mineral material in said furnace;
   b. measuring the heat input Q used to raise the temperature of the mineral material in said furnace;
   c. calculating the entropy E according to the equation

$$E = (Q/T)$$

d. comparing E with a setpoint entropy $E_O$, said setpoint being developed historically to provide the most uniform temperature for the mineral material exiting said furnace;
   e. changing the rate of heat input Q to a new value of heat input Q' responsive to the comparison of E with $E_O$ to reduce the difference between E and $E_O$; and
   f. supplying heat input Q' to said furnace.

2. The method of claim 1 in which Q is changed to Q' only if $[E - E_O]$ exceeds a predetermined value $E_L$.

3. The method of claim 1 comprising generating a signal whenever $[E - E_O]$ exceeds a predetermined value $E_A$.

4. The method of claim 1 comprising maintaining the entropy E substantially equal to $E_O$.

* * * * *